United States Patent [19]

Ryan

[11] Patent Number: 5,048,187
[45] Date of Patent: Sep. 17, 1991

[54] WHIP TYPE WEED CUTTER

[76] Inventor: Patrick J. Ryan, 840 W. Moreland Dr., No. 11, Vernon Hills, Ill. 60061

[21] Appl. No.: 595,181

[22] Filed: Oct. 9, 1990

[51] Int. Cl.$^5$ .............................................. B26B 7/00
[52] U.S. Cl. ........................................ 30/276; 30/293
[58] Field of Search ................. 30/276, 283, 284, 264, 30/347, DIG. 5, 391

[56] References Cited

U.S. PATENT DOCUMENTS

| | | | |
|---|---|---|---|
| 4,702,005 | 10/1987 | Pittinger | 30/276 |
| 4,744,148 | 5/1988 | Brown | 30/347 X |
| 4,864,728 | 9/1989 | Kloft et al. | 30/347 X |

Primary Examiner—Douglas D. Watts
Attorney, Agent, or Firm—Charles F. Meroni, Jr.

[57] ABSTRACT

A cutter attachment for a mono-filament type trimmer implement including a trimmer support shaft and a cutter in the form of a rotatable mono-filament used for lawn trimming mounted at a free end thereof. The cutter attachment has a base secured to the trimmer support shaft above the cutter. An elongated swingable rod shaped guard has a closed guard end and a pair of free ends positioned in adjacency to the base. An attachment device joins the free ends of the guard to the base enabling the elongated swingable rod shaped guard to be swung from a "storage position" where the closed end of the guard rests on and overlies the shaft in a "guard position" where the closed guard end overlies the cutter for protecting shrubs, trees and the like. The guard is a triangularly shaped open ended rod that is secured by the attachment device to a conventional commercial type whip type weed cutter.

20 Claims, 2 Drawing Sheets

WHIP TYPE WEED CUTTER

BACKGROUND OF THE INVENTION

As is known, lawn and/or yard trimming equipment of the mono-filament type, commonly marketed as "weed eaters", are in widespread use. An objectionable feature inherent with such equipment, however, is the susceptibility of, for example, lawn scalping tree and bush scalping that is in the instance where the equipment and/or implement is brought into too close proximity to trees, shrubs and the like causing them damage and also too close proximity to fences and ornamental rocks and the like where the mono-filament can be damaged as a result of striking such surfaces.

The invention overcomes the preceding difficulties by providing an attachment that is secured to a support shaft or handle for a rotating mono-filament type trimmer implement which, when in a "storage position" can be maintained in such a way as to avoid the otherwise normal operation of the trimmer implement and then when the guard is brought into its so-called "guard position" it can then function to protect trees, shrubs, and also eliminate the likelihood that the mono-filament cutter can come into striking engagement against surfaces that might tend to break the filament such as metallic fencing, sharp rocks, and the like.

From my study of the prior art, it has come to my attention that there are a number of U.S. patents that relate to various types of trimmer attachments including the following patents:

| Inventors Name | Title of Patent | U.S. Pat. No. |
| --- | --- | --- |
| Edward A. Ireland | Shield for Grass Timmer | 4,200,978 |
| Robert C. Comer et al | Cutting Element for Vegetation Line Trimmers | 4,282,653 |
| Ruedi Fellmann | Garden Trimmer | 4,360,971 |
| Robert G. Evers | Line Guard for a Line Cutting Type Weed Trimmer | 4,651,422 |
| Lawrence H. Morita | Guard for Vegetation Cutting Device | 4,756,084 |
| John W. Gorski | Grass Trimmer | 4,823,464 |
| David W. Powell | Trimmer Attachment | 4,872,265 |
| George H. Whitkop | Cutter Guard | 4,890,389 |

From my study of the aforesaid patents and my overall knowledge of the art. It is my belief that I have developed a new and improved cutter attachment and guard assembly which is not shown in any prior art known to me.

SUMMARY OF THE INVENTION

A cutter attachment for a mono-filament type trimmer implement including a trimmer support shaft and a cutter in the form of a rotatable mono-filament used for lawn trimming mounted at a free end thereof comprising a base secured to the trimmer support shaft above the cutter, an elongated swingable rod shaped guard having a closed guard end and a pair of free ends positioned in adjacency to the base, and attachment means joining the free ends of the guard to the base enabling the elongated swingable rod shaped guard to be swung from a "storage position" where the closed end of the guard rests on and overlies the shaft rearwardly behind the cutter to a "guard position" where the closed guard end extends forwardly beyond the cutter for protecting shrubs, trees and the like from the rotatable mono-filament on the cutter.

My cutter has a triangularly shaped open ended rod that is secured by a clamp to a conventional commercial type whip type weed cutter. The triangular rod shaped guard embodies important features of the invention. This guard has a knife midway of its outermost leg which projects downwardly and into the orbital path of the nylon whip or cutter that is clamped or suitably secured to the rotary drum that is powered by a motor and carried on the cutter. In order to trim the length of the nylon strand to a proper length, the cutter is positioned in the orbital path when the guard is in its so-called "guard position". The triangular guard also functions to act as a spacing device to hold trees, shrubs and other obstacles such as rocks in spaced relation to the end of the nylon cutter. The reason for the guard is to protect small trees and shrubs so that the nylon strand cannot be readily engaged against the shrub or tree to cut the bark.

When it is desired to return the guard or brace to an inoperative position, it can pivot on its clamping device 180°, and can be then secured to the handle or shaft of the cutter by a suitable fastener. The fastener is of such type in the embodiment illustrated whereby the outer leg of the triangular guard can be engaged behind the semi-circular fastener so that the guard will then be maintained in an inoperative or "storage position" when not needed.

According to other features of my invention I have provided a cutter attachment for a mono-filament type trimmer element. The element includes a trimmer support shaft and a cutter in the form of a rotatable mono-filament used for lawn trimming mounted at a free end thereof comprising a base secured to the trimmer support shaft above the cutter, an elongated swingable rod shaped guard having a closed guard end and a pair of free ends positioned in adjacency to the base, and attachment means providing a connection connecting the free ends of the guard to the base which connection can be made loose to enable the elongated swingable rod shaped guard to be swung from a "storage position" where the closed end of the guard rests on and overlies the shaft in a "guard position" where the closed guard end overlies the cutter for protecting shrubs, trees and the like and which connection can be manually adjusted to make the connection tight to hold the guard in its adjusted position.

DESCRIPTION OF THE ELEMENTS

Figure 1:
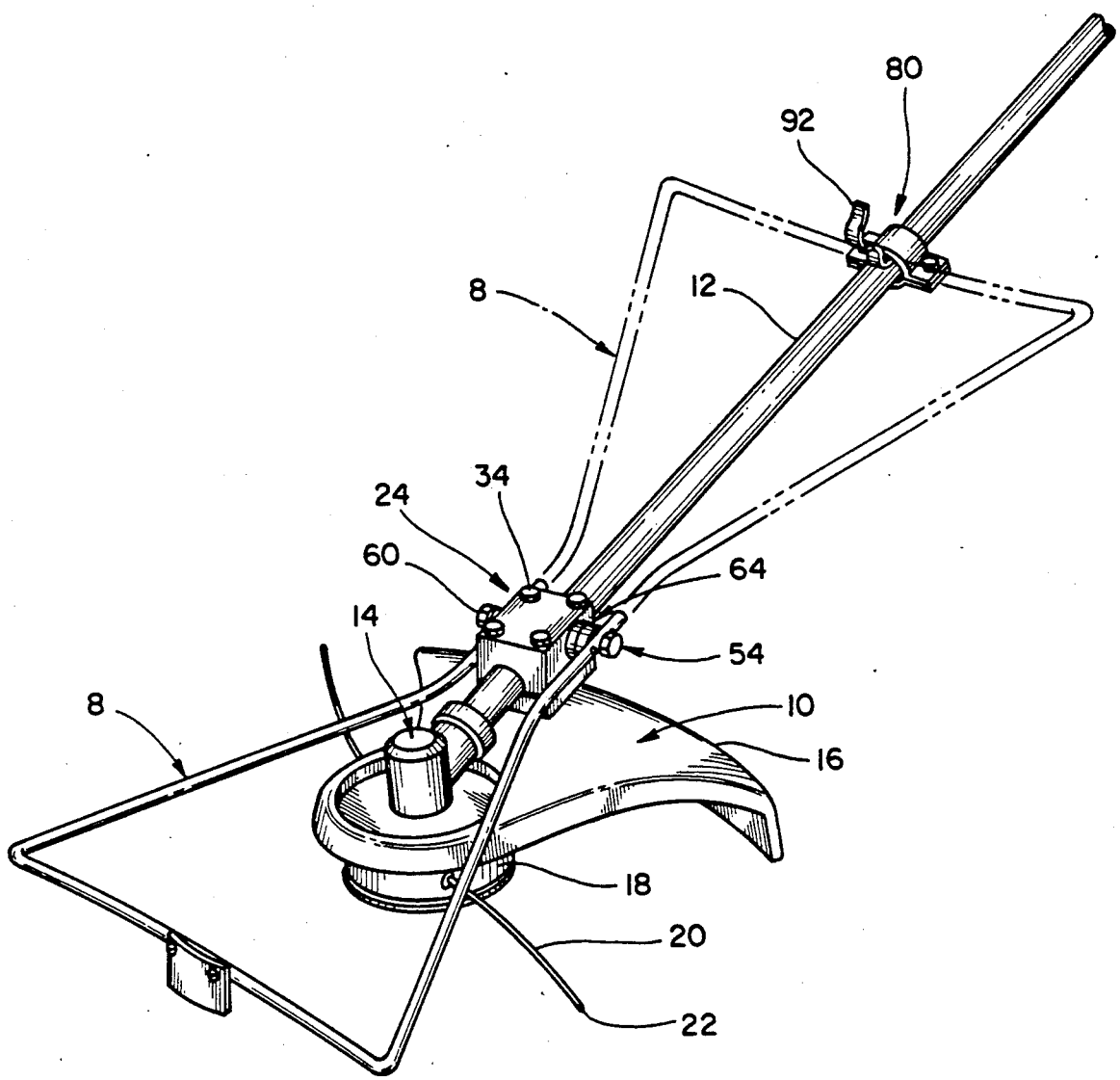
FIG. 1 is a perspective view of a cutter attachment as it is adapted for use with a mono-filament type trimmer implement, which attachment possesses a guard shown in dotted and full lines that embodies important features of my invention.

The reference numeral 8 indicates generally a cutter attachment for a trimmer implement 10 commonly known as a "weed eater", which is in widespread use throughout the U.S.A. The cutter attachment 8 itself embodies important features of my invention and also in combination with the trimmer implement 10.

The trimmer implement 10 includes a trimmer handle or support shaft 12 on which my cutter attachment 8 is attached. The handle 12 further has a mounting bracket 14 suitably secured at its lower end. Carried on the mounting bracket 14 in a conventional manner is a trimmer implement shield 16. Also carried on the mounting 14 in a conventional manner is a rotary driven drum 18. Attached to the rotary driven drum 18 is a rotatable mono-filament 20, which has a free cutting or whipping end 22 that is adapted to cut grasses and weeds in a manner well-known in the art. Typical trimmer implements 10 are shown in a number of the prior art patents that were previously listed herein, and an exemplary trimmer is shown in U.S. Pat. No. 4,282,653.

In accordance with my invention, the cutter attachment 8 includes a mounting block or a mounting base such as is indicated generally at 24. The block 24 includes a pair of split halves 26 and 28 each of which has opposed mated grooved portions 30 and 32 for receiving the handle 12. A series of four bolt and nut fasteners 34 are provided for securing the halves 26 and 28 to the handle or support shaft 12 as shown in the drawings.

Figure 3:
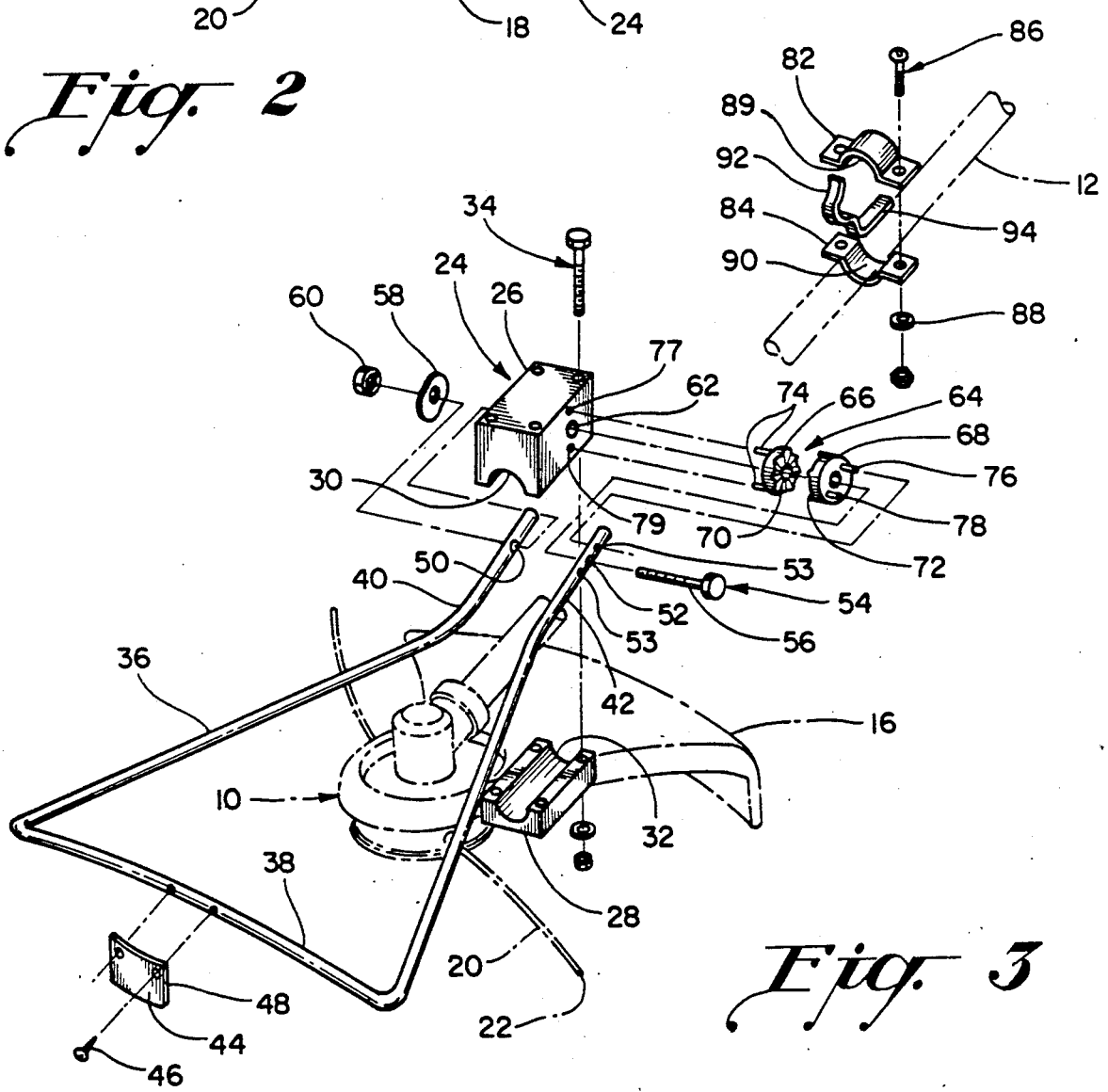
FIG. 3 is an enlarged exploded view of my cutter attachment embodying important features of my invention and with the trimmer implement being diagrammatically illustrated in dotted lines.

A rod-shaped guard 36 of generally a loop shaped or triangular shape is provided. It is made of a tough steel rod. The guard 36 can be made out of a suitable material such as a synthetic plastic rod which can be ⅜" thick. The synthetic plastic can be of the following composition: polypropylene or nylon No. 14 also, if desired, the guard 34 can be manufactured from a suitable steel having a diameter of ⅜". The guard is mounted on the mounting block 24 and more specifically on the upper block half 26 as is clearly shown in FIG. 3. To this end, the rod-shaped guard 36 includes a closed guard end 38 and a pair of free guard ends 40 and 42. The closed guard end 38 has a cutter 44 that is secured by screws 46 to the closed guard end 38 as further seen in FIG. 3. While the screws are illustrated as being positioned on a front side of the cutter 44, I have found that it may be desirable to manufacture the cutter with an L-shaped configuration and to attach the cutter with screws entering from a top surface of the guard rather than a forward facing surface, with this modification the screws would no longer protrude forwardly of the cutter. Other alternatives are also available without departing from the scope of my invention. This cutter 44 extends downwardly away from the closed guard end 38, and is adapted to co-act with the rotatable mono-filament 22 to cut off any excess filament that extends beyond a knife edge 48 of the cutter 44.

In order to mount the rod-shaped guard 36 on the mounting lock 24, the free ends 40 and 42 are provided with a series of holes indicated generally at 50-52, and fastener assemblies 54 are provided for securing the free ends 40 and 42 to the mounting block 24. More specifically, the fastener assemblies 54 include a bolt 56, a spring washer 58, and a lock nut 60.

To further insure that the fastener 54 will be properly secured to the rod-shaped guard 36, and more particularly to the free ends 40 and 42, I have provided a manually adjustable guard position adjusting device 64 which embodies certain specific features of my invention. The device 64 is comprised of a pair of inner and outer toothed guard positioning rings or ring-shaped wheels 66 and 68. The wheel 66 has eight teeth 70, and the wheel 68 has four teeth 72. A pair of mounting pins 74 are mounted on an inside surface of the wheel 66. A second pair of pins 76 and 78 are mounted on the outer ring or ring-shaped wheel 68. If desired, the device 64 can be eliminated and a more simple bracket can be used to allow the guard to swing through its arc and only be secured either in its storage position by clamp 80 or held in its guard position with a more simple clamp rather than using the device 64 for adjustment of the guard in any one of a series of selectable positions as shown in FIG. 2.

In order to mount the ring or ring-shaped wheel 66 onto the mounting block or base 24, the base is provided with a pair of horizontally extending holes 77 and 79 which are positioned on vertically upper and lower levels relative to an orifice or passageway 62, which is adapted to receive the bolt 56. It is the bolt 56 that extends through the rings or ring-shaped wheels 66 and 68 to secure them to the base 24. The spring washer 58 and the locknut 60 are used to attach the guard 36 to the mounting block or base 24. To this end, the bolt also extends through the bolt holes 50 and 52 in the free guard ends 40 and 42 to clamp the rod-shaped guard 36 in assembly with the mounting block or base 24. A pair of pin holes 53-53 are provided on opposite sides of the hole 52, and these holes are adapted to receive the pins 76 and 78 to further connect the rings or ring-shaped wheel 68 in connected assembly so that as the wheel 68 is rotated, the rod-shaped guard will co-rotate with the wheel through an arc of approximately 180° as shown in FIG. 2.

Figure 2:
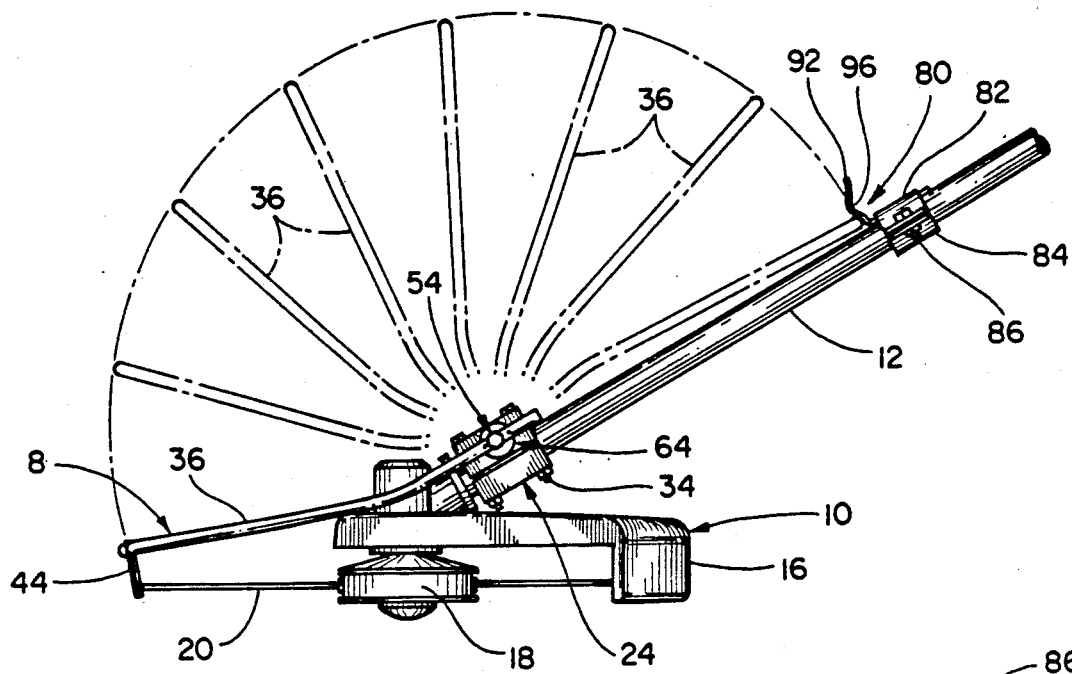
FIG. 2 is an enlarged fragmentary side view of the cutter attachment and trimmer implement shown in FIG. 1 with the guard being shown in full and dotted lines illustrating the way that the guard can be moved back and forth from an operating position or guard position to a storage position.

Thus, it will be appreciated from the foregoing description, that when it is desired to move the rod-shaped guard 36 to one of the illustrated positions shown in FIG. 2, the ring or ring-shaped wheel 68 and its teeth 72 are disengaged from the teeth 70 on the wheel 66, and the wheel 68 is then manually rotated to the new position where it is desired that the guard 36 shall be located. When this new position is reached, then the wheel 68 is manually released, and then its teeth 72 will re-engage with the teeth 70 on the ring or ring-shaped wheel 66 to lock the rod-shaped guard 36 in its new adjusted position. The washer 58 and the locknut 60 serve to ensure that the threaded bolt 56 does not become disengaged from the base 24 once it has been adjusted in position. The spring 58 provides a spring loading, but this loading is only of such character as to hold the meshed teeth on the rings or ring-shaped wheels 66 and 68 together after the teeth have been manually adjusted so that the rod-shaped guard can be held in its adjusted position. The spring loading is also of a character that the ring-shaped wheels 66 and 68 can be manually disengaged to move the wheels and their teeth 70 and 72 to a newly adjusted position as previously described.

It will be further seen from a consideration of FIG. 2 that the guard 36 is shown in full lines in one of its so-called "guard positions" at the lower left-hand side of FIG. 2. Similarly, the guard 36 is shown in its dotted line position at the upper right-hand side of FIG. 2 where the guard is located in its so-called "storage position". A clamp 80 is provided to maintain the rod-shaped guard 36 in its storage position. To this end, the clamp has a pair of clamp members 82 and 84 which are adapted to engage on opposite sides of the handle 12, and a pair of nut and bolt fasteners 86-86 are provided and cooperate with washers 88 for holding the clamp members in fixed assembly on the trimmer handle or support shaft 12. These clamp members 82 and 84 are further provided with grooved portions 89 and 90 which are arcuately shaped so that they can grip the outer perimeter of the circular exterior surface of the handle or support shaft 12. The clamp 80 is further provided with a resiliently deflectable latch member 92. This latch member 92 has a latch attaching finger 94 that underlies the upper clamp member 82 so that when the clamp members are secured by the fasteners 86–86, the latch member 92 is also firmly clamped to the trimmer handle or support shaft 12. This latch attaching finger 94 has a resiliently reflectable springable latch shoulder 96 (FIG. 2). The closed end 38 of the rod-shaped guard is movable over the shoulder 96 into retained engagement with the clamp 80. When it is desired to detach the rod-shaped guard 36, the guard 36 and its closed end can be manually lifted over the springable latch shoulder 96 to free the closed end 38 of the guard 36 from the clamp so as to move the rod-shaped guard 36 out of its so-called "storage position".

The rod-shaped guard 36, in its illustrated embodiment, has a generally triangular shaped configuration so that it can maintain shrubs and trees out of contact with the mono-filament cutting element 20. The closed guard end 38 of the guard 36 is 17" from the hole 62 that extends transversely across the base 24 so that the pin or bolt 56 can be positioned in generally parallel relation to the closed guard end or leg 38. The end or leg 38 has a dimension of approximately 12", and is one leg of an isosceles triangle with the legs connected at opposite ends of the leg 38 comprising the other legs of the triangularly shaped guard 36.

The mono-filament line 20 can be positioned at a 45° angle or a 95° angle relative to the head 18. As shown, the mono-filament line is positioned at a 45° angle relative to the head 18. Now by providing the attachment 8 with the manually adjustable guard position adjusting device, the relative position of the guard 36 can be varied depending on the angular position of the mono-filament line 20 relative to the head 18 whether it is 45°, 65° or 90°. By providing this type of adjustable cutter implement or attachment, the attachment can be used on different types of trimmer implements 10 where the angular relationship between the rotatable mono-filament line 20 may be varied relative to the head 18 in any of the relationships such as 45°, 65° or 95°.

It will further be appreciated that if the shrubs are in an overhead position and it is desired to maintain them out of contact away from the cutter 20, then the guard 36 can be mounted at one of the intermediate positions shown between the full line position of the guard 36 and the so-called "storage position" of the guard 36 at the right-hand side of the FIG. 2 where the dotted line illustration of the rod-shaped guard 36 is shown to be retainingly engaged behind the springable latching shoulder 96.

I claim:

1. A cutter attachment for a mono-filament type trimmer implement including a trimmer support shaft and a cutter in the form of a rotatable mono-filament used for lawn trimming mounted at a free end thereof comprising a base secured to said trimmer support shaft above said cutter, an elongated swingable rod shaped guard having a closed guard end and a pair of free ends positioned in adjacency to said base, and attachment means joining said free ends of said guard to said base enabling said elongated swingable rod shaped guard to be swung from a "storage position" where said closed end of the guard rests on and overlies said shaft rearwardly behind said cutter to a "guard position" where said closed guard end extends forwardly beyond said cutter for protecting shrubs, trees and the like from the rotatable mono-filament on said cutter.

2. The attachment of claim 1 where said guard is swingable back and forth in an arc approximately 180° over said cutter from said "storage position" to said "guard position".

3. The attachment of claim 1 where snap lock means is provided on said shaft for locking said closed end to said trimmer support shaft in said "storage position".

4. The attachment of claim 1 where lock means is secured to said base cooperable with said attachment means for locking said free ends of said guard and fixing said closed guard end in said "guard position" and against accidental movement.

5. The attachment of claim 1 where said guard is of a triangular shape and with said pair of free ends extend away from a closed end of the triangular shape in parallel relation to said trimmer support shaft.

6. The attachment of claim 5 further characterized by said attachment means being operable to fix the position of said guard at a pre-selected position so that the guard can be positioned either forwardly of the cutter or can overlie the cutter for maintaining the cutter in gap relation to overhanging objects to be protected or guarded from.

7. The attachment of claim 1 where said guard is of a loop-shaped configuration and is swingable back and forth relative to its points of attachment where said free ends are joined with said base by said attachment means and with the guard being swingable back and forth in an arc of approximately 180° so as to be positionable either forwardly of the cutter or in overlying relation with respect to said cutter or in its "storage position", as may be desired by selected adjustment of said attachment means.

8. The attachment of claim 1 where said guard is of a triangular shape and possesses a leg that extends generally at right angles to said pair of free ends, and a mono-filament cutter attached to said leg for trimming a rotatable mono-filament so that the filament does not extend radially beyond said mono-filament cutter.

9. The attachment of claim 1 where said base comprises a pair of grooved split halves, means joining said split halves to said trimmer support shaft at a point of overlying adjacency to said cutter, and snap lock means being provided on said shaft for locking said closed end to said trimmer support shaft in said "storage position" and with said snap lock means being positioned upwardly on said trimmer support shaft on one side of said base upwardly and away from said base.

10. The attachment of claim 1 where said attachment means including a bolt, holes being provided in said free ends and in said base with said bolt being extendable through the holes for attaching the free ends to said base, and a locknut attached to an outer end of said bolt for holding the free ends and the base in assembly together.

11. The attachment of claim 10 further characterized wherein a manually adjustable guard position adjusting device is mounted on said bolt for selectively fixing said guard in any one of a series of pre-selectable positions as said guard is swingable back and forth and pivoted on said bolt through an arc of approximately 180° over said cutter from "storage position" to said "guard position" and to fixable locations therebetween.

12. The attachment of claim 11 where snap lock means is provided on said shaft for locking said closed end to said trimmer support shaft in said "storage position".

13. A cutter attachment for a mono-filament type trimmer implement including a trimmer support shaft and a cutter in the form of a rotatable mono-filament used for lawn trimming mounted at a free end thereof comprising a base secured to the trimmer support shaft above the cutter, an elongated swingable rod shaped guard having a closed guard end and a pair of free ends positioned in adjacency to the base, and attachment means providing a connection connecting the free ends of the guard to the base which connection can be made loose to enable the elongated swingable rod shaped guard to be swung from a "storage position" where the closed end of the guard rests on and overlies the shaft in a "guard position" where the closed guard end overlies the cutter for protecting shrubs, trees and the like and which connection can be manually adjusted to make the connection tight to hold the guard in its adjusted position.

14. The attachment of claim 1 where said guard is of a triangular shape and with said pair of free ends extend away from a closed end of the triangular shape in parallel relation to said trimmer support shaft, said attachment means being operable to fix the position of said guard at a pre-selected position so that the guard can be positioned forwardly of the cutter or can overlie the cutter.

15. The attachment of claim 13 where said guard is of a loop-shaped configuration and is swingable back and forth relative to its points of attachment where said free ends are joined with said base by said attachment means and with the guard being swingable back and forth in an arc of approximately 180° so as to be positionable either forwardly of the cutter or in overlying relation with respect to said cutter or in its "storage position", as may be desired by selected adjustment of said attachment means.

16. The attachment of claim 13 where said base comprises a pair of grooved split halves, means joining said split halves to said trimmer support shaft at a point of overlying adjacency to said cutter, and snap lock means being provided on said shaft for locking said closed end to said trimmer support shaft in said "storage position" and with said snap lock means being positioned upwardly on said trimmer support shaft on one side of said base upwardly and away from said base, said attachment means including a bolt, holes being provided in said free ends and in said base with said bolt being extendable through the holes for attaching the free ends of said guard to said base, and a locknut attached to an outer end of said bolt for holding the free ends and the base in assembly together.

17. In combination, a cutter attachment and a mono-filament type trimmer implement, said implement including a trimmer support shaft and a cutter having driven a rotatable mono-filament weed cutting line used for lawn trimming mounted at a free end of said implement, said attachment comprising a base secured to the trimmer support shaft above the cutter, an elongated swingable rod shaped guard having a closed guard end and a pair of free ends positioned in adjacency to the base, and attachment means providing a connection connecting the free ends of the guard to the base which connection can be made loose to enable the elongated swingable rod shaped guard to be swung from a "storage position" where the closed end of the guard rests on and overlies the shaft in a "guard position" where the closed guard end overlies the cutter for protecting shrubs, trees and the like and which connection can be manually adjusted to make the connection tight to hold the guard in its adjusted position.

18. The combination of claim 17 where said guard is of a triangular shape and possesses a leg that extends generally at right angles to said pair of free ends, and a mono-filament cutter attached to said leg for trimming a rotatable mono-filament so that the filament does not extend radially beyond said mono-filament cutter.

19. The combination of claim 17 where lock means is secured to said base cooperable with said attachment means for locking said free ends of said guard and fixing said closed guard end in said "guard position" and against accidental movement.

20. The combination of claim 17 where said guard is of a loop-shaped configuration and is swingable back and forth relative to its points of attachment where said free ends are joined with said base by said attachment means and with the guard being swingable back and forth in an arc of approximately 180° so as to be positionable either forwardly of the cutter or in overlying relation with respect to said cutter or in its "storage position", as may be desired by selected adjustment of said attachment means.

* * * * *